United States Patent

Hebert et al.

[11] Patent Number: 6,050,527
[45] Date of Patent: Apr. 18, 2000

[54] FLOW CONTROL DEVICE TO ELIMINATE CAVITY RESONANCE

[75] Inventors: Leonard J. Hebert, Kirkland; Wendell R. Miller, Bellevue; Eric H. Nesbitt, Duvall; Jerry Piro, Bellevue, all of Wash.; Michael L. Sangwin, Marietta, Ga.

[73] Assignee: The Boeing Company, Seattle, Wash.

[21] Appl. No.: 09/183,812

[22] Filed: Dec. 19, 1997

[51] Int. Cl.[7] .................................................. B64C 21/06
[52] U.S. Cl. ........................ 244/210; 244/209; 244/53 B; 137/15.1
[58] Field of Search ................................ 244/53 B, 137.1, 244/1 R, 209, 210, 23 D, 110 B; 137/15.1, 15.2; 138/40; 60/230

[56] References Cited

U.S. PATENT DOCUMENTS

| | | |
|---|---|---|
| 2,791,387 | 5/1957 | Weinberg .............................. 244/137.1 |
| 3,740,006 | 6/1973 | Maher . |
| 3,934,846 | 1/1976 | Maurer ................................. 244/137.1 |
| 4,132,240 | 1/1979 | Frantz ................................... 244/53 B |
| 4,174,083 | 11/1979 | Mohn ................................... 244/53 B |
| 4,203,566 | 5/1980 | Lord ..................................... 244/53 B |
| 4,418,879 | 12/1983 | Vanderleest . |
| 4,422,524 | 12/1983 | Osborn ..................................... 60/230 |
| 4,696,442 | 9/1987 | Mazzitelli . |
| 4,703,904 | 11/1987 | Haslund ................................... 244/1 R |
| 4,844,382 | 7/1989 | Raisbeck ............................... 244/53 B |
| 5,291,672 | 3/1994 | Brown ..................................... 60/262 |
| 5,884,843 | 3/1999 | Lidstone et al. .................... 239/265.13 |

Primary Examiner—Peter M. Poon
Assistant Examiner—Charles R. Ducker, Jr.
Attorney, Agent, or Firm—Christensen O'Connor Johnson Kindness PLLC

[57] ABSTRACT

A flow control device and method for eliminating flow-induced cavity resonance within a closed or nearly closed end flow passage (20) having an inlet opening (30) defined between an upstream inlet edge (32) and a downstream inlet edge (34). The passage accepts exterior fluid flow (38) therein via the opening (30). The flow control device includes a stationary inlet guide vane (44) having a leading edge (46), a trailing edge (48), and a number of support members (50) to connect the vane to the inlet. The vane (44) is positioned such that the vane leading edge intercepts the exterior fluid flow shear layer, and the vane trailing edge extends into the passage at the inlet. In a preferred embodiment, the inlet guide vane is located approximately midway between the upstream and downstream inlet edges. The inlet guide vane is cross-sectionally shaped as a cambered airfoil. Flow-induced cavity resonance is reduced or eliminated in the closed or nearly closed end passage through the interception of the free shear layer passing over the inlet opening with an inlet guide vane flow control device.

22 Claims, 5 Drawing Sheets

FLOW CONTROL DEVICE TO ELIMINATE CAVITY RESONANCE

FIELD OF THE INVENTION

The present invention relates to devices for reducing or eliminating cavity aero-acoustic resonances within a closed end or nearly closed end fluid passage, and more particularly for reducing or eliminating aero-acoustic resonances within an aircraft airflow inlet with a nearly closed downstream end.

BACKGROUND OF THE INVENTION

When fluid flows over the open end of a passage with a closed or nearly closed downstream end, amplified resonant pressure waves can form. If the amplification is extreme, damage to the passage structure can occur. Many fluid flow systems employ flush or quasi-flush inlet geometries that are susceptible to this phenomenon. By way of example, FIGS. 1 and 2 show portions of an exemplary prior art precooler intake system of a commercial aircraft. Fan air 38 flows across the precooler inlet opening 30. When the downstream end of the precooler intake ducting is closed or nearly closed (e.g., by a valve 40), resonant pressure fluctuation can occur. Another example of where this phenomenon occurs is at the various piping junctions in gas pipeline networks.

Current solutions to this problem have been flow condition specific and have not been entirely satisfactory. In some instances, fluid flow systems have been redesigned entirely in order to minimize pressure fluctuations. In other systems, holes have been drilled in the passage closed end to effectively de-tune the system aero-acoustically. It is not always possible to use these types of solutions, due to limited temperature and/or pressure margins of downstream components receiving the intake fluid.

In yet other systems, the inlet duct length is shortened and an air dam is positioned upstream of the inlet to spoil the incoming flow. These modifications appear to reduce the magnitude of the pressure fluctuations, but for some inlets, the reductions may be insufficient to reduce inlet duct stresses to acceptable levels. Additionally, the performance of downstream components will be affected adversely due to the aerodynamic losses of the dam. Thus, these changes can in some instances, reduce fluid resonance to tolerable levels, but, as with the valve holes, negatively impact the flow efficiency of the system.

Thus, a need exists for a flow control device and method useful in reducing or preferably eliminating pressure fluctuations within a closed end fluid passage. The ideal device would be lightweight, inexpensive, easy to install, and easy to maintain. The present invention is directed to fulfilling this need.

SUMMARY OF THE INVENTION

In accordance with aspects of the present invention, a system for eliminating flow-induced cavity resonance is provided, including a closed or nearly closed end fluid flow passage. The passage includes an inlet with an opening defined between an upstream inlet edge and a downstream inlet edge. Exterior fluid flows over the opening across the upstream and downstream inlet edges to form a shear layer. The system further includes a flow control device having an inlet guide vane connected to the inlet. The vane includes a leading edge and a trailing edge, and is preferably positioned such that the vane leading edge intercepts the outermost portion of exterior fluid flow shear layer and the vane trailing edge is located within the passage.

In accordance with other aspects of this invention, the inlet guide vane leading edge is located approximately midway between the upstream and downstream inlet edges. The inlet guide vane extends across the entire width of the inlet. The passage is oriented at an non-orthogonal angle relative to the exterior fluid flow and the inlet guide vane includes an angle of attack relative to the exterior fluid flow that is similar to the passage angle.

In accordance with further aspects of this invention, support members are provided to interconnect the inlet guide vane and an inlet passage wall. The inlet guide vane and support members are preferably integrally formed.

In one embodiment, the closed end passage is the fan air intake passage of a turbofan engine precooler system. The inlet guide vane is cross-sectionally shaped as an airfoil having a chord length in the range of about 3 inches to about 6 inches and a camber in the range of about 4% to about 6%.

In accordance with still other aspects of this invention, a method of reducing flow-induced cavity resonance in a closed end or nearly closed end fluid flow passage is provided. The passage includes an inlet with an opening defined between an upstream inlet surface and a downstream inlet surface. The passage is capable of accepting exterior flow therein via the opening. Portions of exterior fluid flow over the opening to form a shear layer. The method includes intercepting the exterior fluid flow shear layer using an inlet guide vane having a leading edge and a trailing edge. The vane is connected to the inlet and positioned such that the vane leading edge preferably intercepts the outermost portion of the exterior flow shear layer and the vane trailing edge is located within the passage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The inventors herein have discovered that reduction and even elimination of amplified coherent pressure fluctuations in a closed end or nearly closed end passage can be obtained by positioning a flow control device formed in accordance with the present invention in the passage open end as described herein.

The present invention is most applicable to a fluid passage having a flush or quasi-flush inlet opening and a closed or nearly closed downstream end. Example objects that may benefit from application of the present invention thereto include flush or quasi-flush fluid inlets, fluid pipeline intersections, cavities such as airplane wheel wells and weapons bays and the like. The description below describes features of the present invention as applied to a precooler intake system on an aircraft turbofan engine nacelle. Because there are numerous other environments within which the present invention may be applied, application to a precooler intake system should be considered illustrative and not limiting.

Figure 1:
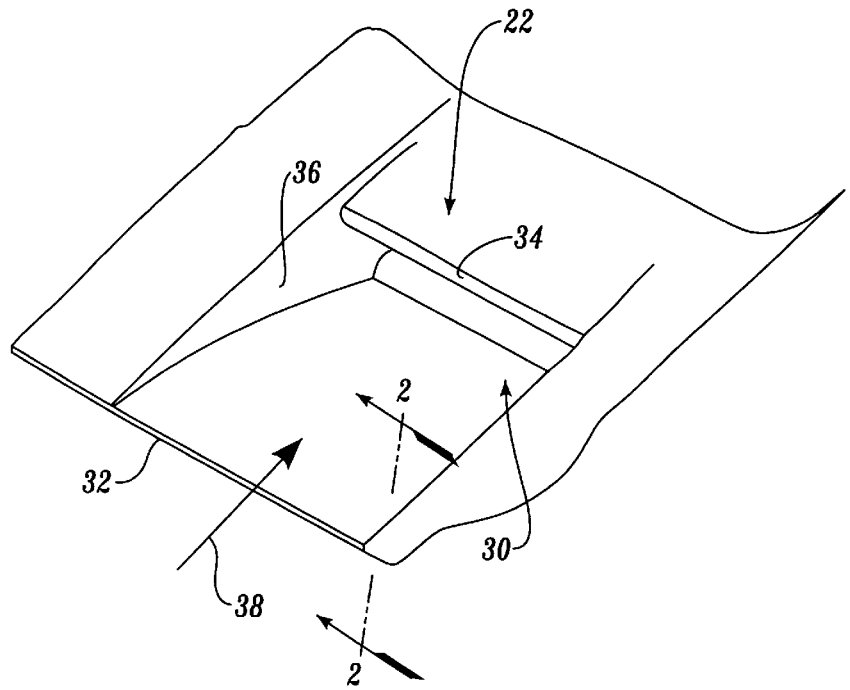
FIG. 1 is a perspective view of an exemplary prior art passage inlet.
Figure 2:
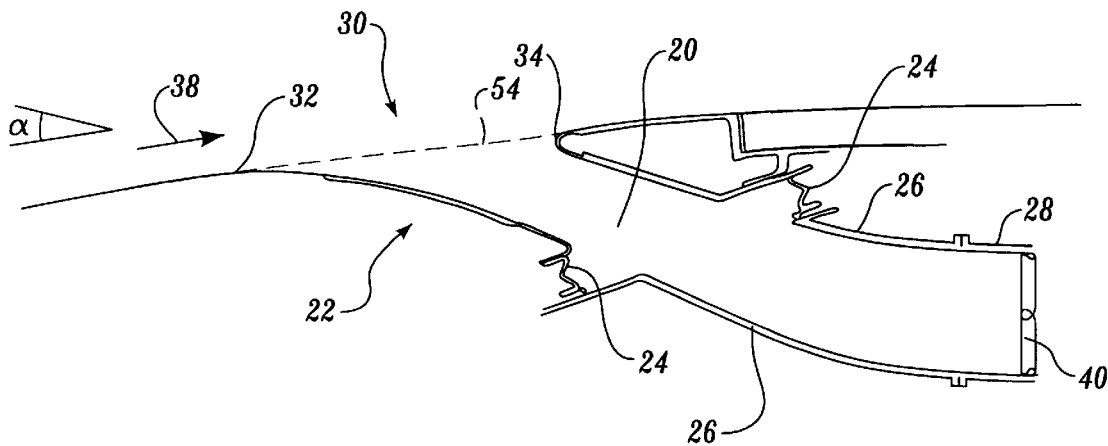
FIG. 2 is a cross-sectional side view of the inlet of FIG. 1.

Referring to FIGS. 1 and 2, there shown are portions of an exemplary prior art rectangular precooler intake system for use within a turbofan jet aircraft engine fan duct (not shown.) The intake system includes an air intake passage 20 that connects to a precooler (not shown.) The precooler is a heat exchanger that cools the engine bleed air to power various pneumatic and environmental systems onboard the aircraft.

The passage 20 is defined by an inlet duct 22, a flange kiss seal 24, various passage structures 26, and a fan air modulator 28. The inlet duct includes an air intake opening 30 formed between an upstream inlet edge 32, a downstream inlet lip 34, and upright side walls 36. The inlet opening is flush or quasi-flush with the direction of fan airflow 38, while the passage is oriented at an angle α. The fan air modulator includes a butterfly-type valve 40 that is continuously positioned to satisfy flow demand. In the butterfly valve open position (not shown), fan air flows into the inlet opening 30, along the passage 20, and to the precooler. In the butterfly valve closed position (shown in FIGS. 2 and 6), fan air 38 can flow into the inlet opening 30, but is prohibited from passing through the butterfly valve 40 and into the precooler.

Referring to FIGS. 3–6, a flow control device formed in accordance with the present invention generally includes an inlet guide vane 44 having a leading edge 46 and a trailing edge 48. In preferred embodiments, the vane 44 is stationary and is sized to extend the entire width of the inlet opening (e.g., between the upright side walls 36.) The vane 44 is connected to the inlet duct 22 using a number of support members 50.

Figure 4:
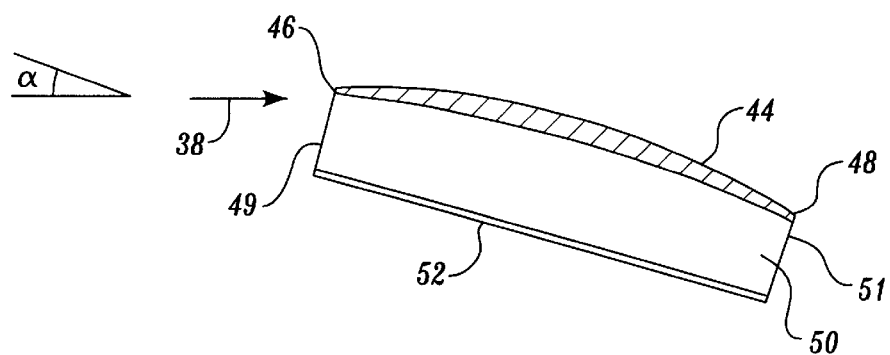
FIG. 4 is a cross-sectional side view of the device of FIG. 3.
Figure 5:
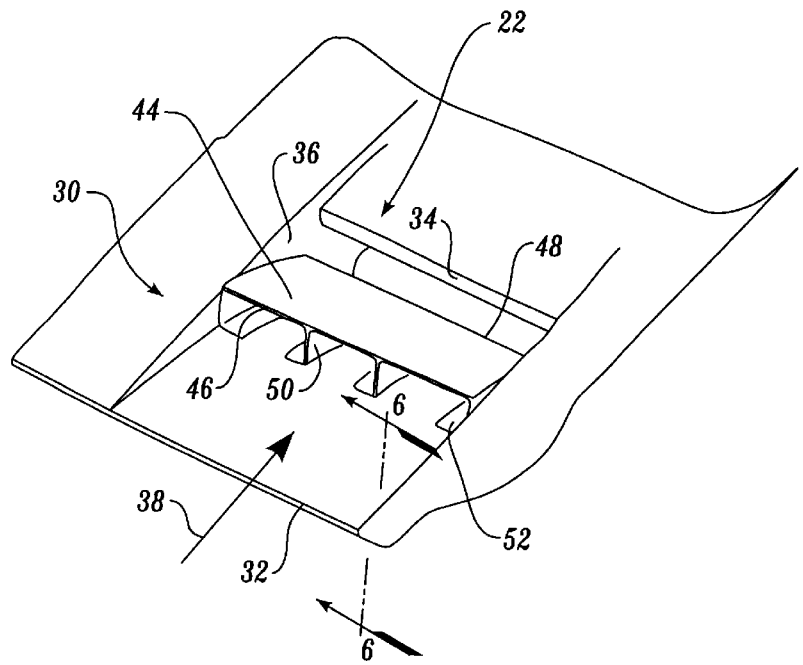
FIG. 5 is a perspective view of the device of FIG. 3 as applied to the passage inlet of FIG. 1.

Shown in FIG. 4 is a cross-sectional side view of the inlet guide vane 44.

The vane has a fixed geometry cross-sectionally shaped as a bicircular airfoil. The vane preferably has camber sufficient to promote turning of the fluid into the passage under flowing conditions and a chord length sufficient to intercept the outermost portion of the shear layer flowing across the inlet opening under low or no passage flow conditions. The dimensions of the vane will vary from one application to another depending on the physical dimensions of the flow intake and flow passages as well as fluid flow conditions throughout the exterior fluid flow and inlet passages. Additionally, a designer should verify that the shape, size, and placement of the vane produces acceptable aerodynamic losses at the critical sizing condition of the downstream components (e.g., the precooler for the air intake system of FIGS. 3–6.)

Figure 3:
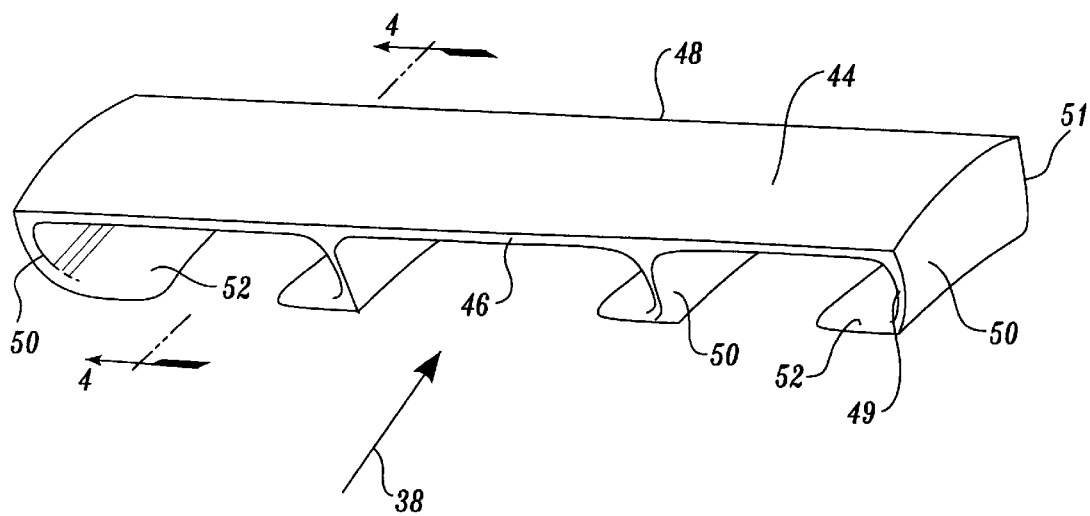
FIG. 3 is a perspective view of a flow control device formed in accordance with the present invention.

The embodiment of FIG. 3 shows four spaced-apart support members, each formed as L-shaped beams having forward and rearward ends 49, 51. The members extend preferably orthogonally between the vane's underside surface and the inlet duct. The members are oriented such that the member forward ends 49 are positioned near the vane leading edge 46, and the member rearward ends 51 are positioned near the vane trailing edge 48. A lower portion or foot 52 of each support member is used to attach the device to an existing inlet duct surface near the inlet opening 30. Alternatively, the vane may be formed integrally with the inlet. In preferred embodiments, the vane and support members are integrally formed from a rigid material such as titanium, aluminum, steel, etc. Other rigid materials may be suitable, though, depending on the forces present during use.

In one exemplary flow control device for use on a Boeing 777 commercial aircraft, the inlet guide vane measures approximately 14 inches lateral width, 4.5 inches in chord length, and approximately 5% camber. Further, the device is made of titanium with a support member height of approximately 1.5 inches.

Figure 6:
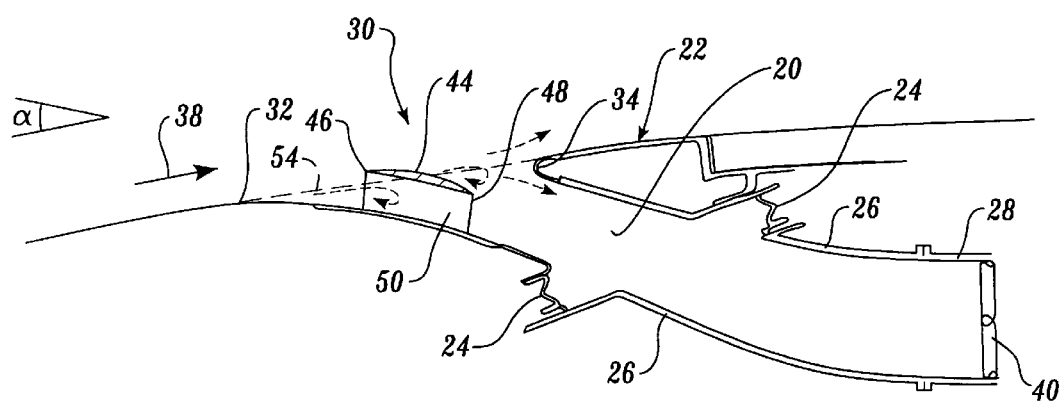
FIG. 6 is a cross-sectional side view of the arrangement of FIG. 5.

Referring particularly to FIG. 6, the flow control device is positioned within the inlet opening such that the vane leading edge is extended slightly into the adjacent fan flow. When the valve 40 is closed as shown in the cross-sectional view of FIG. 6, an imaginary line 54 extends across the inlet opening. The line represents the fan flow shear layer and extends from the position of flow separation (roughly at the upstream inlet edge 32) to the position of flow attachment (roughly at the downstream inlet lip 34). During use with the butterfly valve closed, the majority of fan air 38 flows outboard of this line to pass over the inlet opening 30 instead of into the inlet opening.

Referring back to FIG. 2, when the valve 40 is closed or nearly closed, it is the inventors' belief that as fan air flows across the inlet opening pressure waves form in the inlet passage that can become resonantly amplified through a shear layer feedback loop. Referring to FIG. 6, it is further the belief of the present inventors that an inlet guide vane formed in accordance with the present invention interferes destructively with this feedback loop when the vane is positioned near the opening and preferably when the vane is positioned with its leading edge located slightly outboard of the imaginary line 54, i.e., so that it extends into the shear layer for that particular application.

Figure 7:
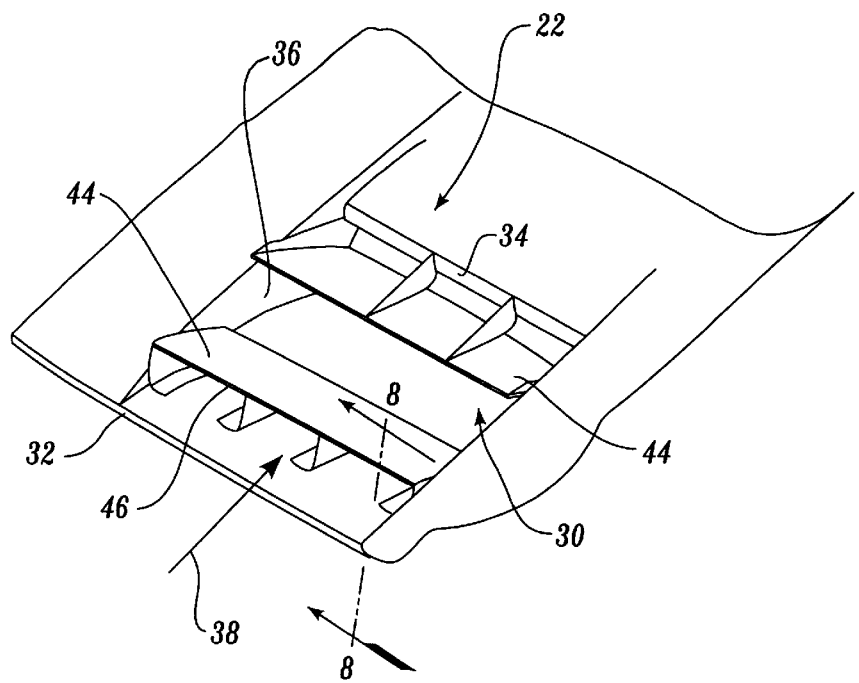
FIG. 7 is a persective view of a second embodiment of a flow control device formed in accordance with the present invention.
Figure 8:
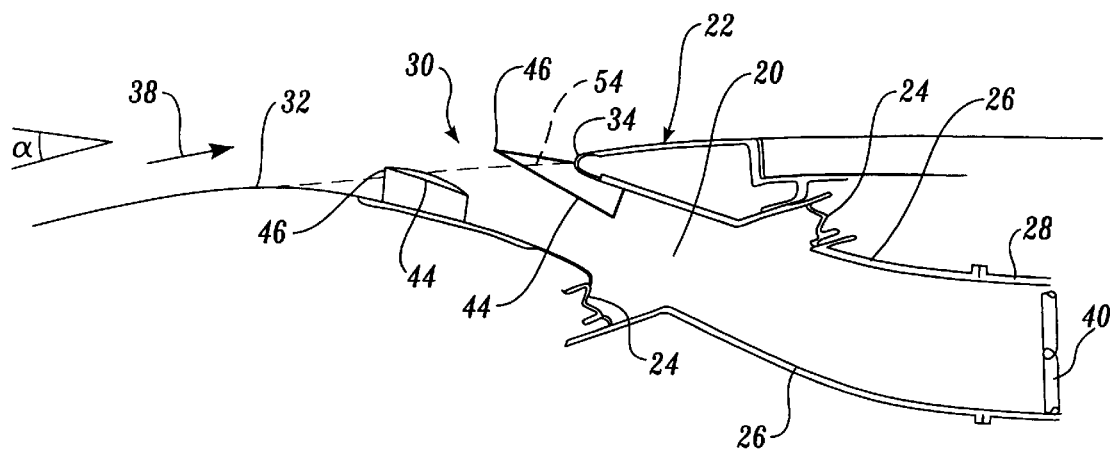
FIG. 8 is a cross-sectional side view of the arrangement of FIG. 7.
Figure 9:
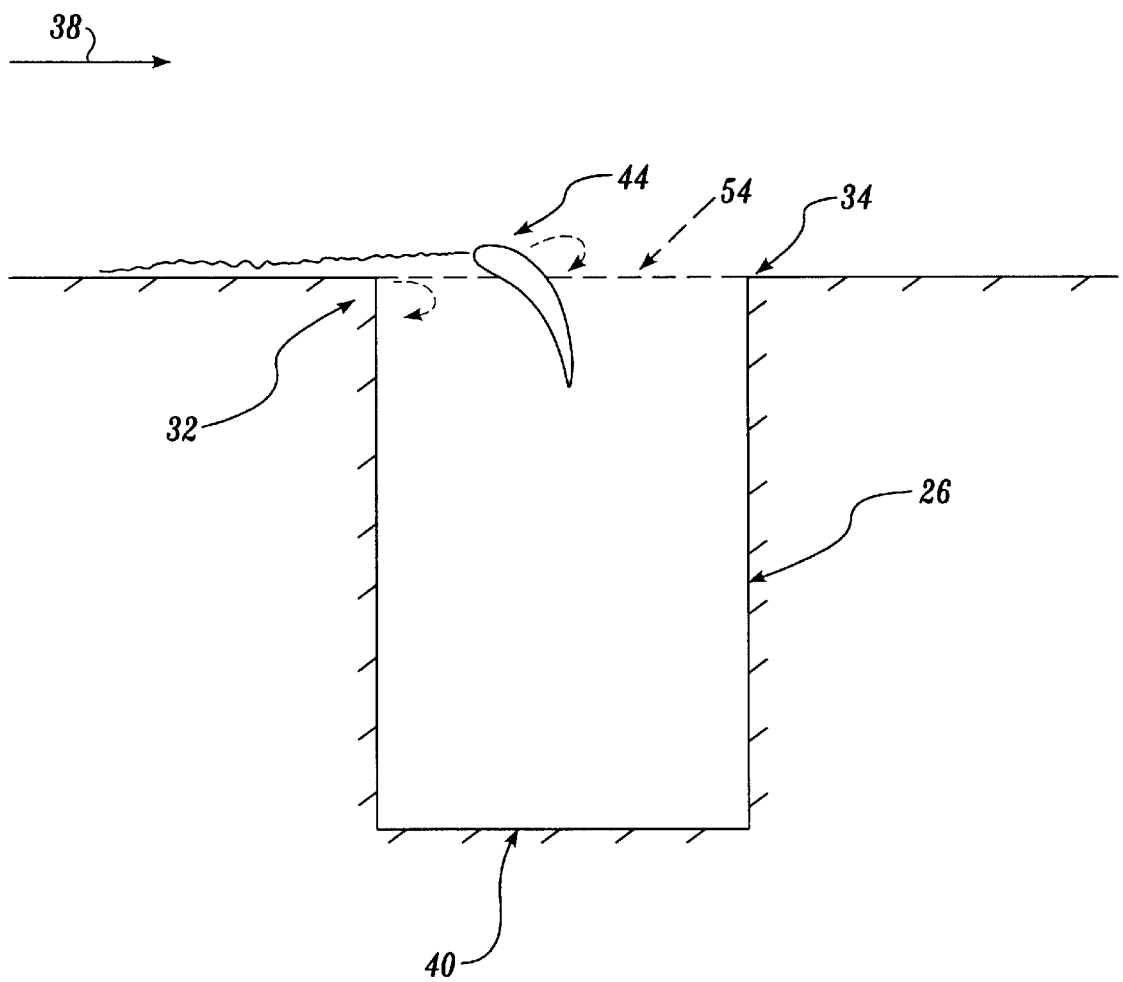
FIG. 9 is a cross-sectional side view of a third embodiment of a flow control device formed in accordance with the present invention.

The inventors herein have obtained good results by placing the vane leading edge in a manner that essentially halves the length of the imaginary line. Alternatively, plural vanes may be used and placed in a manner that divides the length of line 54 into multiple portions, see for example FIGS. 7 and 8. The vane angle of attack relative to the direction of fan flow will vary according to the particular application and the anticipated fluid flow conditions. In the embodiment of FIGS. 3–6, the inlet guide vane 44 has a non-orthogonal angle of attack relative to the direction of fan air flow in an amount that is similar to the inlet passage angle of attack α. FIG. 9 shows an orthogonal arrangement that may be used as well.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for eliminating flow-induced cavity resonance comprising:

(a) a closed or nearly closed end fluid flow passage having an inlet with an opening defined between an upstream inlet edge and a downstream inlet edge, exterior fluid flowing over the opening across the upstream and downstream inlet edges to form a shear layer; and (b) a flow control device including an inlet guide vane having a leading edge and a trailing edge, the vane being connected to the inlet at a fixed stationary orientation in which the vane leading edge intercepts the exterior fluid flow shear layer and the vane trailing edge is located within the passage; the flow control device promoting destruction of flow-induced cavity resonance within the closed or nearly closed end passage.

2. The system according to claim 1, wherein the inlet guide vane leading edge is located approximately midway between the upstream and downstream inlet edges.

3. The system according to claim 1, wherein the inlet guide vane extends across the entire width of the inlet.

4. The system according to claim 1, wherein the inlet guide vane is cross-sectionally shaped as an airfoil having a chord length in the range of about 3 inches to about 6 inches and a camber in the range of about 4% to about 6%.

5. The system according to claim 1, wherein the inlet guide vane is cross-sectionally shaped as a flow turning airfoil.

6. The system according to claim 1, further comprising support members interconnected between a surface of the inlet guide vane with a passage wall at the inlet.

7. The system according to claim 1, wherein the inlet guide vane and support members are integrally formed.

8. The system according to claim 1, wherein the passage is oriented at an non-orthogonal angle relative to the exterior fluid flow and the inlet guide vane includes an angle of attack relative to the exterior fluid flow that is similar to the passage angle.

9. The system according to claim 1, wherein the passage and inlet guide vane are oriented at an orthogonal angle relative to the exterior fluid flow.

10. In a fluid flow passage having an inlet with an opening defined between an upstream inlet edge and a downstream inlet edge, the passage being capable of accepting exterior flow therein via the opening, portions of exterior fluid flowing over the opening across the upstream and downstream inlet edges to form a shear layer; the passage further including a closed or nearly closed end with a valve, the valve having an open position in which air may flow out the passage end and a closed or nearly closed positioned in which air is prohibited from flowing out the passage end; an improvement comprising:

a flow control device for eliminating flow-induced cavity resonance within the flow passage when the valve is in a closed or nearly closed positioned, the flow control device comprising at least one inlet guide vane having a leading edge and a trailing edge, the vane being adapted for connection to the inlet within the passage, the vane being positioned in a fixed stationary orientation such that the vane leading edge intercepts the exterior flow shear layer and the vane trailing edge is located within the passage;

wherein during the valve closed or nearly closed position, the flow control device promotes destruction of flow-induced cavity resonance within the passage; and during the valve open position, the flow control device presents minimal flow losses.

11. The improvement according to claim 10, wherein the at least one inlet guide vane is located approximately midway between the upstream and downstream inlet edges.

12. The improvement according to claim 10, wherein the inlet includes multiple guide vanes distributed between the upstream and downstream inlet edges.

13. The improvement according to claim 10, wherein the at least one inlet guide vane extends across the entire width of the inlet.

14. The improvement according to claim 10, wherein the at least one inlet guide vane includes an interior surface, the vane being connected to the inlet using a number of support member extending between the vane interior surface and a passage wall.

15. The improvement according to claim 10, wherein the at least one inlet guide vane is cross-sectionally shaped as a flow turning airfoil.

16. A method of reducing flow-induced cavity resonance in fluid flow passage having an inlet with an opening defined between an upstream inlet surface and a downstream inlet surface, the passage being capable of accepting exterior flow therein via the opening, portions of exterior fluid flowing over the opening to form a shear layer, the method comprising:

closing the fluid flow passage at a location downstream of the inlet opening;

intercepting the exterior fluid flow shear layer when the passage is closed by using an inlet guide vane having a leading edge and a trailing edge, the vane being connected to the inlet, the vane being positioned in a fixed stationary orientation such that the vane leading edge intercepts the exterior flow shear layer and the vane trailing edge is located within the passage.

17. The method according to claim 16, wherein the interception occurs near the outermost edge of the exterior flow shear layer.

18. The method according to claim 16, wherein the inlet guide vane is cross-sectionally shaped as a flow turning airfoil.

19. The method according to claim 16, wherein the inlet guide vane is cross-sectionally shaped as an airfoil having a chord length in the range of about 3 inches to about 6 inches and a camber in the range of about 4% to about 6%.

20. The method according to claim 16, wherein the inlet guide vane is located approximately midway between the upstream and downstream inlet surfaces.

21. The method according to claim 16, wherein the passage is oriented at an non-orthogonal angle relative to the exterior fluid flow and the inlet guide vane includes an angle of attack relative to the exterior fluid flow that is similar to the passage angle.

22. The method according to claim 16, wherein the passage and inlet guide vane are oriented at an orthogonal angle relative to the exterior fluid flow.

* * * * *